US009893502B2

(12) United States Patent
Baldwin et al.

(10) Patent No.: US 9,893,502 B2
(45) Date of Patent: Feb. 13, 2018

(54) ELECTRICAL DEVICE COVER WITH KEYHOLE INSERTS

(71) Applicant: Hubbell Incorporated, Shelton, CT (US)

(72) Inventors: Jeffrey P. Baldwin, Phoenix, AZ (US); Richard L. Cleghorn, Tempe, AZ (US); Marcus Shotey, Scottsdale, AZ (US); Sam Dumpe, Scottsdale, AZ (US); Jason Thomas, Mesa, AZ (US); Ryan Liebengood, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/484,764

(22) Filed: Apr. 11, 2017

(65) Prior Publication Data

US 2017/0222413 A1    Aug. 3, 2017

Related U.S. Application Data

(60) Continuation of application No. 14/445,341, filed on Jul. 29, 2014, now Pat. No. 9,620,946, which is a division of application No. 13/084,448, filed on Apr. 11, 2011, now Pat. No. 8,816,200.

(60) Provisional application No. 61/322,630, filed on Apr. 9, 2010.

(51) Int. Cl.
*H01H 9/02* (2006.01)
*H02G 3/08* (2006.01)

(52) U.S. Cl.
CPC ............. *H02G 3/081* (2013.01); *H02G 3/088* (2013.01)

(58) Field of Classification Search
CPC .......... H02G 3/088; H02G 3/081; H02G 3/14; H02G 1/00; H02G 3/085; Y10T 29/49964; Y10T 29/49963; H01H 9/02; H01H 9/00; H01R 13/5213; H01R 25/003
USPC .......... 174/50, 53, 57, 58, 66, 67, 559, 666; 200/329, 332.1, 333; 220/3.2-3.9, 4.02, 220/241, 242; 436/536; D13/177
See application file for complete search history.

(56) References Cited

U.S. PATENT DOCUMENTS

| | | | |
|---|---|---|---|
| 1,557,526 | A | 10/1925 | Hartmann |
| 2,810,028 | A | 10/1957 | Hopper |
| 4,343,411 | A | 8/1982 | Chestnut et al. |
| 4,737,599 | A | 4/1988 | Fontaine |
| 5,280,135 | A | 1/1994 | Berlin et al. |
| 5,763,831 | A | 6/1998 | Shotey et al. |

(Continued)

*Primary Examiner* — Angel R Estrada
(74) *Attorney, Agent, or Firm* — Michael Best & Friedrich, LLP

(57) ABSTRACT

A base for an electrical outlet having a front surface and a back surface, at least one opening extending there through, the at least one opening having a size large enough to receive a socket face, at least one mounting screw aperture opening extending through the base, the mounting screw aperture having a first portion sized large enough to receive a mounting screw head, and at least a second portion extending into the first portion and through the base, the second portion sized large enough to allow a mounting screw shaft to extend through the base but small enough to disallow the mounting screw head from passing through the base, at least one keyhole cover removably secured within the first portion, and wherein the base is configured with the second portion of the mounting screw aperture accessible after the base is installed on the electrical outlet.

20 Claims, 24 Drawing Sheets

(56) References Cited

U.S. PATENT DOCUMENTS

| | | | |
|---|---|---|---|
| 6,133,531 | A | 10/2000 | Hayduke et al. |
| 6,222,123 | B1 | 4/2001 | Schwarz |
| 6,642,453 | B2 | 11/2003 | Shotey et al. |
| 6,770,816 | B2 | 8/2004 | Shotey et al. |
| 6,924,433 | B2 | 8/2005 | Shotey et al. |
| 6,987,225 | B2 | 1/2006 | Shotey et al. |
| 7,119,277 | B1 | 10/2006 | Shotey et al. |
| 7,323,639 | B1 | 1/2008 | Shotey et al. |
| 7,939,758 | B1 * | 5/2011 | Shotey ............... H02G 3/14 174/66 |
| 8,816,200 | B1 * | 8/2014 | Baldwin ............ H02G 3/14 174/66 |
| 9,419,371 | B2 * | 8/2016 | Thomas ........... H01R 13/5213 |
| 9,620,946 | B2 * | 4/2017 | Baldwin ............ H02G 3/14 |
| 2005/0000719 | A1 | 1/2005 | Shotey et al. |
| 2008/0179071 | A1 | 7/2008 | Jolly |
| 2008/0179072 | A1 | 7/2008 | Drane et al. |

* cited by examiner

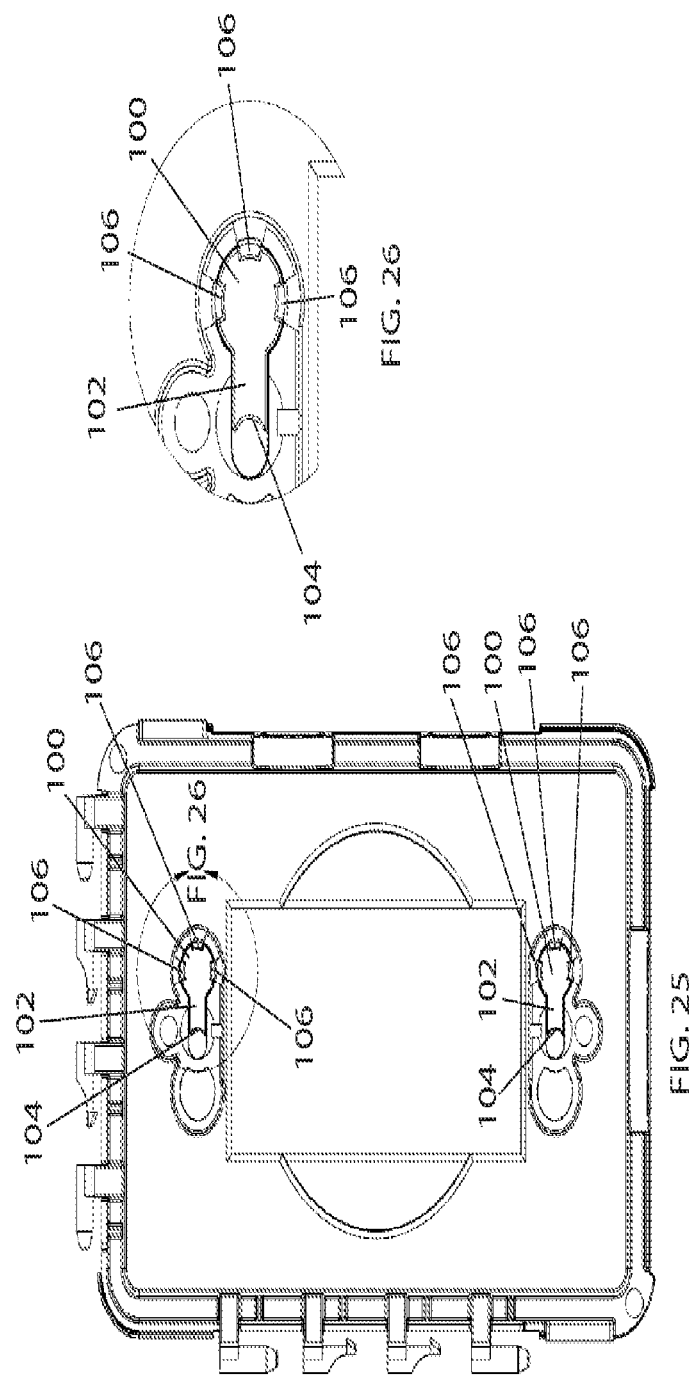

ELECTRICAL DEVICE COVER WITH KEYHOLE INSERTS

CROSS REFERENCE TO RELATED APPLICATIONS

This Application claims the benefit of the filing date of U.S. Provisional Patent Application 61/322,630 to Baldwin et al. entitled "Electrical Device Cover with Keyhole Inserts" which was filed on Apr. 9, 2010, the disclosure of which is hereby incorporated herein by reference.

BACKGROUND OF THE INVENTION

1. Technical Field

Aspects of the present disclosure relate to electrical outlets and receptacles, and more specifically to covers for such outlets and receptacles, and related components and methods.

2. Background Art

Electrical outlets traditionally have included an assembly of components that include the electrical receptacle, a box into which the receptacle is mounted, and a cover plate. Traditional cover plates typically cover the outlet, except for the socket face or faces, at which the socket faces of the receptacle contact the plug. Such traditional cover plates commonly are mounted to the receptacle using a cover plate mounting screw located substantially in the center of the receptacle and cover plate.

In some instances, it is desirable to have a base position around the receptacle, or specifically around the socket face or faces, for example, to which a cover or cover plate may be attached. In recent years, for example, it has become desirable, particularly for exterior or outdoor applications, to have a receptacle cover that covers the entire receptacle, including the socket faces, so that water and other liquids cannot contact the interface at which the plug contacts the socket face or faces when the outlet is in use.

While the advent of weatherproof covers and particularly in-use weatherproof covers prevent moisture from entering the electrical device, any openings within the electrical device covers provide the potential for water to enter the electrical box and create an electrical short.

SUMMARY

This disclosure includes one or more electrical devices covers with inserts.

A particular aspect broadly includes a base for an electrical outlet having at least one opening for a socket face, the base including a front surface and a back surface opposing the front surface, at least one opening extending through the base from the front surface to the back surface, the at least one opening having a size large enough to receive at least one socket face, at least one mounting screw aperture opening extending through the base, the mounting screw aperture having a first portion sized large enough to receive a head of a mounting screw, and at least a second portion extending into the first portion and through the base, the second portion sized large enough to allow a shaft of the mounting screw to extend though the base but small enough to disallow the head of the mounting screw from passing through the base, at least one keyhole cover removably secured within the first portion, and wherein the base is configured with the second portion of the mounting screw aperture accessible after the base is installed on the electrical outlet for selective tightening, loosening, and adjustment of the base.

In particular implementations, the base may be a single molded piece. The base may also include a first peripheral side of the base having at least one hinge member thereon. The keyhole cover may further include a tab extending from an outer surface. The keyhole cover may include a first smaller perimeter and a second large perimeter. The keyhole cover may be at least partially within the second portion.

In additional particular implementations, the keyhole cover may be composed of a flexible material. The keyhole cover may be composed of a rigid plastic. The keyhole cover may further include at least one tooth engaging the back surface. The keyhole cover may be secured within the first portion after the mounting screw is tightened. The keyhole cover may contact the at least one mounting screw head or the at least one mounting screw shaft.

A particular aspect may broadly include a base for an electrical outlet, the electrical outlet including a mounting screw aperture disposed along a longitudinal axis for receiving a mounting screw having a mounting screw head to mount the electrical outlet to a box, the mounting screw head having a mounting screw head diameter, the electrical outlet also having at least one socket face for receiving an electrical plug, the base including a substantially planar backing member, the backing member including at least one aperture for receiving the at least one socket face, a keyhole slot disposed in the backing member and having first and second keyhole slot apertures, the first keyhole slot aperture being larger than the mounting screw head diameter, the second keyhole slot aperture being smaller than the mounting screw head diameter, being disposed in the backing member at a location on the longitudinal axis, and being aligned with the mounting screw aperture when the base is mounted to the electrical outlet using the mounting screw, and a keyhole cover removably secured within the first keyhole slot.

In particular implementations, the keyhole cover may further include a tab extending from an outer surface. The keyhole cover may be composed of a rigid plastic. The keyhole cover may further include a first smaller perimeter and a second larger perimeter. At least a portion of the keyhole cover may be within the second keyhole slot. The keyhole cover may be secured within the first portion after the mounting screw is tightened. The keyhole cover may be composed of a flexible material.

A particular aspect may include a method of mounting a base piece to an electrical outlet, the method including partially inserting a mounting screw through a mounting screw aperture of the electrical outlet, providing the base with at least a first edge with a respective hinge member thereon, positioning the base in relation to the electrical outlet so that at least one mounting screw aperture opening extending through the base is aligned with a head of the mounting screw, the at least one mounting screw aperture having a first portion sized large enough to receive the head of the mounting screw and at least a second portion extending into the first portion and through the base, the second portion sized large enough to allow a shaft of the mounting screw to extend through the base but small enough to disallow the head of the mounting screw through the base, passing the mounting screw head into the first portion of the mounting screw aperture, aligning the base with the electrical outlet so that a socket face of the electrical outlet aligns with a socket face aperture in the base and so that a shaft of the mounting screw extends through a second portion of the mounting screw aperture, tightening the mounting screw to secure the mounting screw head on to the base, and inserting a keyhole cover within the at least one mounting screw aperture second portion.

In particular implementations, tightening the mounting screw further includes tightening the mounting screw head into a bevel associated with the second portion of the mounting screw aperture.

BRIEF DESCRIPTION OF THE DRAWINGS

Features of particular embodiments and implementations of covers for an electrical devices will hereinafter be described in conjunction with the appended drawings, where like designations denote like elements, and:

FIG. 25 is a rear elevation view of an electrical device cover with a keyhole cover in position; and, FIG. 26 is an enlarged view of the section identified as FIG. 26 in FIG. 25.

DETAILED DESCRIPTION

Accordingly, there are a variety of electrical device covers which can incorporate keyhole and adapter plate covers.

FIGS. 1 through 26 illustrate various aspects and implementations of a keyhole cover on an electrical outlet cover with a base 10. While a wide variety of aspects are shown and described, repetitive numbering of common elements has been omitted. Further, an electrical device, a socket device face, and an electrical device cover have been omitted from the drawings as one of ordinary skill in the art will immediately understand the interaction of the elements omitted from the drawings with base 10.

Figure 1:
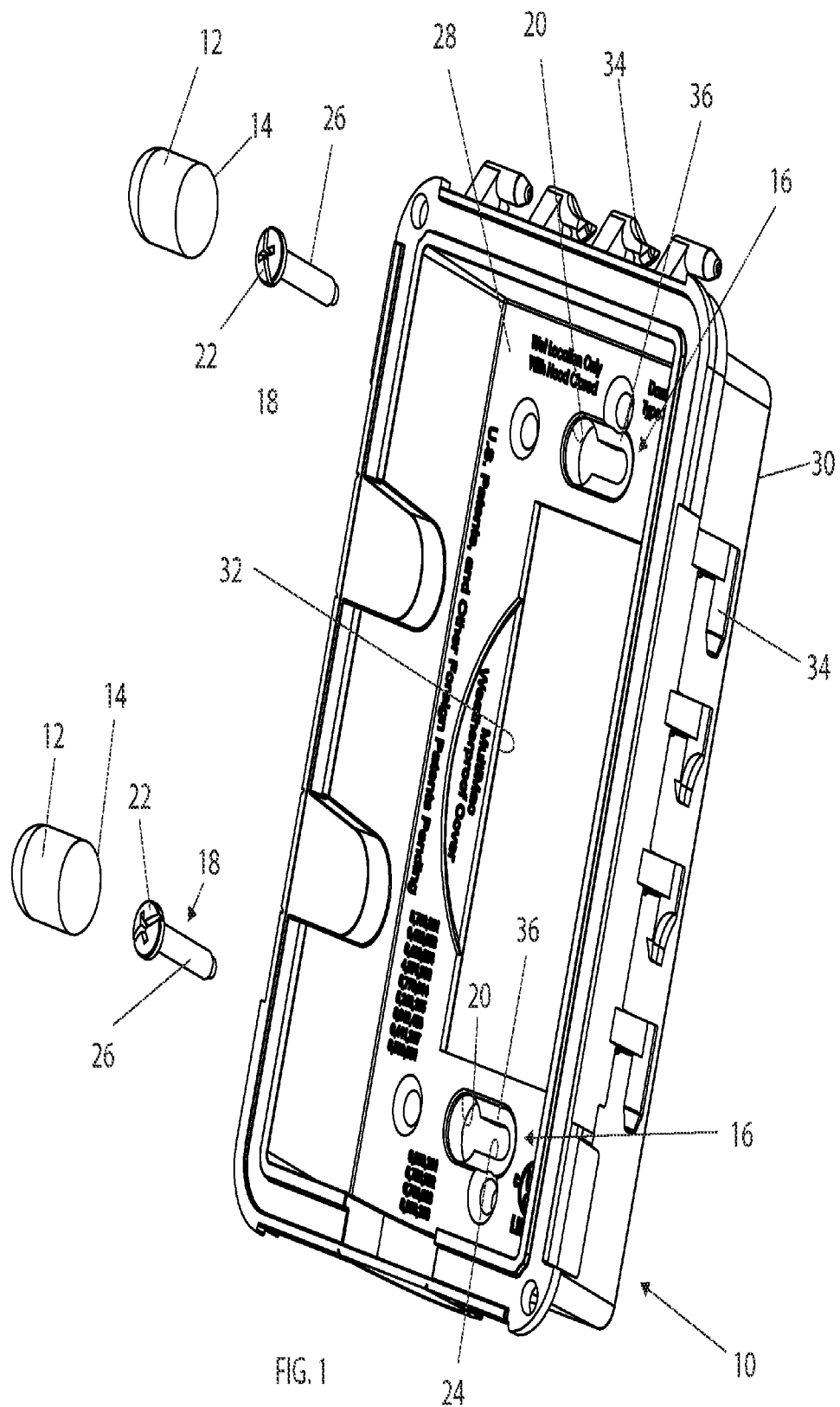
FIG. 1 is a perspective exploded view of an electrical device cover with keyhole covers.
Figure 2:
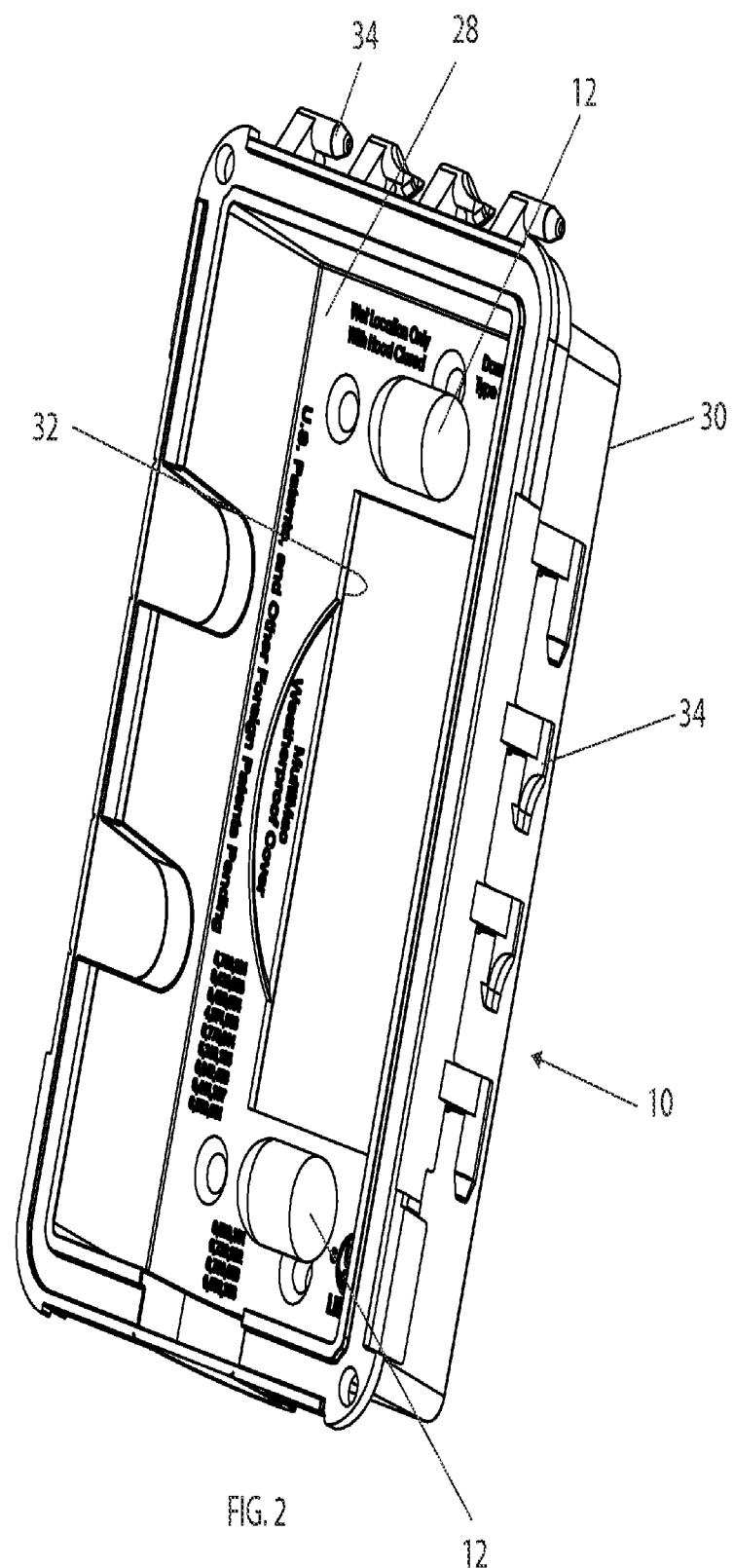
FIG. 2 is a perspective view of an electrical device cover with keyhole covers installed.

FIGS. 1 and 2 illustrate a first aspect keyhole cover 12 having a mounting surface 14. Keyhole cover 12 mounts around a keyhole 16 located in base 10 after mounting screws 18 are tightened in the final position. Keyholes 16 each include a first portion 20 sized large enough to receive a head 22 of mounting screw 18 and a second portion 24 connected to the first portion and sized to allow a shaft 26 of mounting screw 18 to pass there through, but prevent head 22 from passing through.

Still further, base 10 also includes a front surface 28 and a back surface 30, with an opening 32 extending from the front surface to the back surface and sized large enough to receive an electrical socket face therein. A hinge 34 may extend from any of the side walls so that a hinge is located on one, two, three, or four sides of the base without departing from the spirit and scope of the disclosure.

During installation, mounting screws 18 may be partially installed within the electrical box until a portion of shaft 26 remains exposed. The installer may then locate base 10 on mounting screws 18 through first portion 20 and then slide base 10 sideways to locate the mounting screws within second portion 24. Further, mounting screw heads 22 may fit within a bevel 36 adjacent keyholes 16. Next, the installer may then tighten mounting screws to secure base 10 to the electrical box and electrical device. Finally, the installer may locate keyhole cover 12 over keyholes 16 by positioning mounting surface 14 in contact with front surface 28 of base 10. Accordingly, keyhole cover 12 can easily be removed at a later date but prevents unauthorized access to the mounting screws and first portion 20 to prevent water from entering the electrical box.

Figure 3:
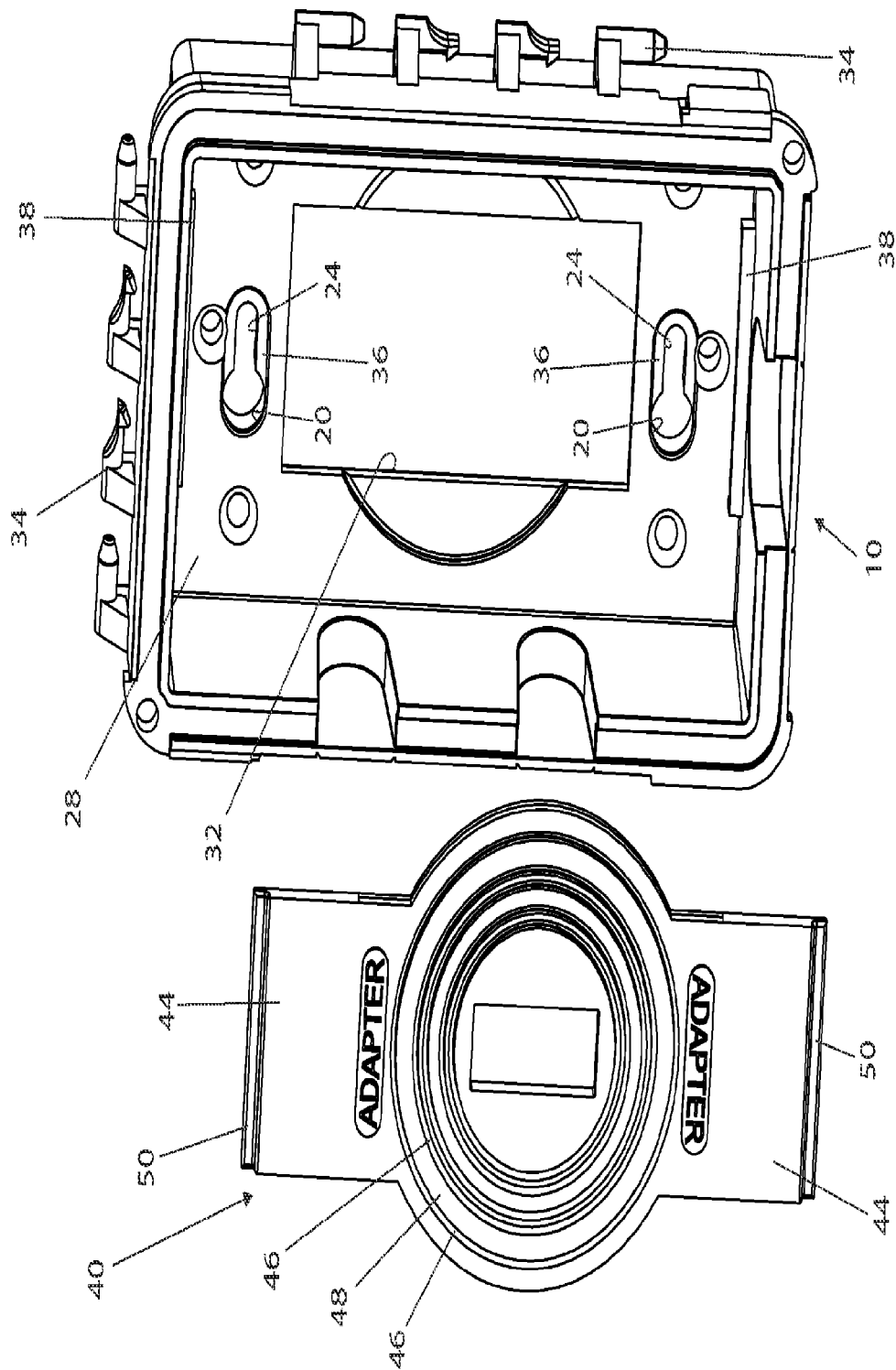
FIG. 3 is an exploded perspective view of an electrical device cover with an adapter plate.
Figure 4:
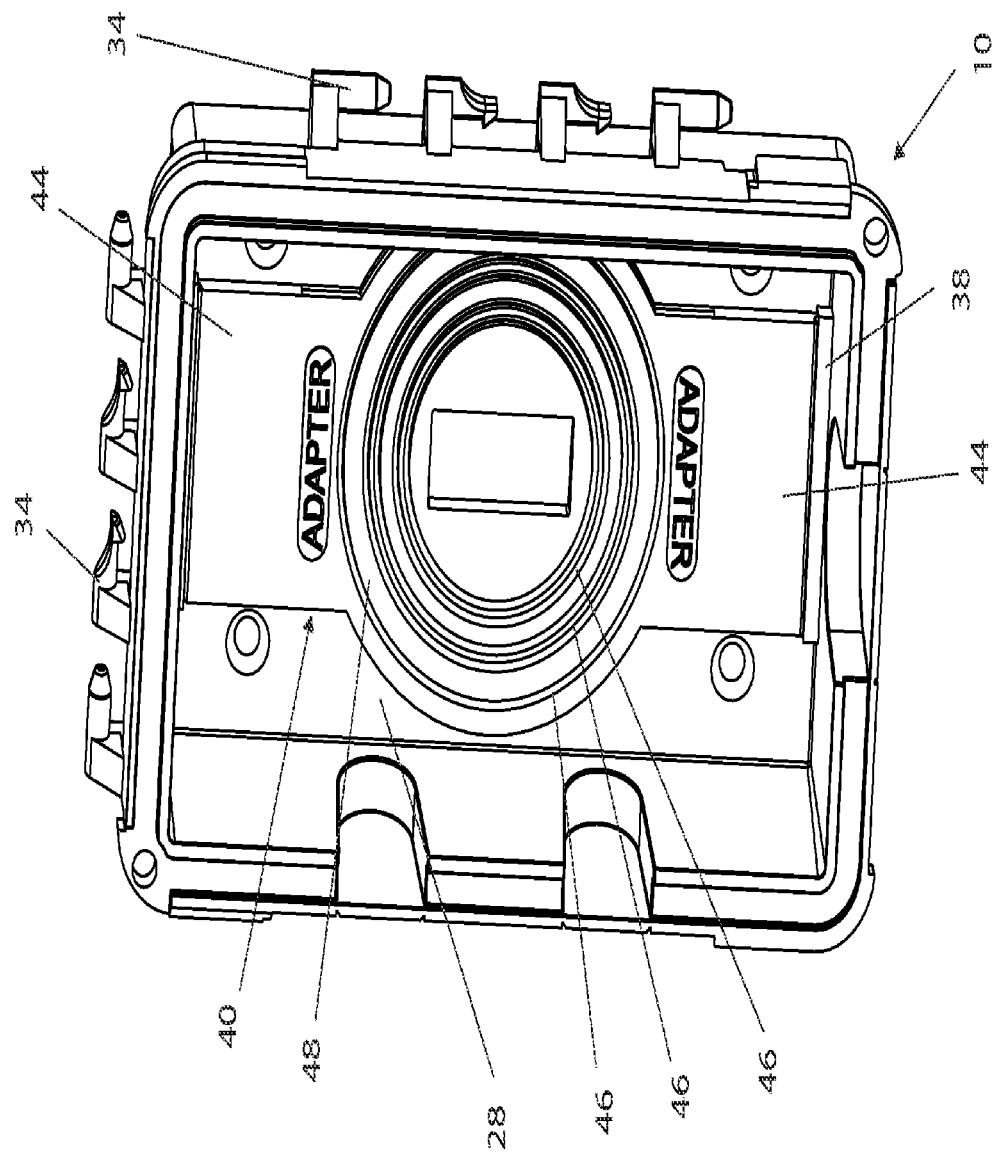
FIG. 4 is a perspective view of an electrical device cover with an adapter plate installed.

FIGS. 3 and 4 illustrate a second aspect keyhole cover arrangement. Specifically, base 10 again includes keyholes 16 but also includes a pair of locking features 38 extending from front surface 28. An adapter 40 includes a central portion 42 with arms 44 extending from the central portion. Central portion 42 may include a thin connecting member 46 between various mounting portions 48. Thin connecting members 46 are preferably solid but thin so that they may be easily broken and removed, while still preventing moisture from entering the electrical box should the thin connecting members 46 be only partially arranged between each mounting portions 48. Further, arms 44 each include mounting tabs 50 which may be removably secured within locking features 38. Accordingly, during use the installer will mount base 10 to the electrical box, and then insert adapter 40 to prevent access to keyholes 16, thereby preventing moisture from entering the electrical box.

Figure 5:
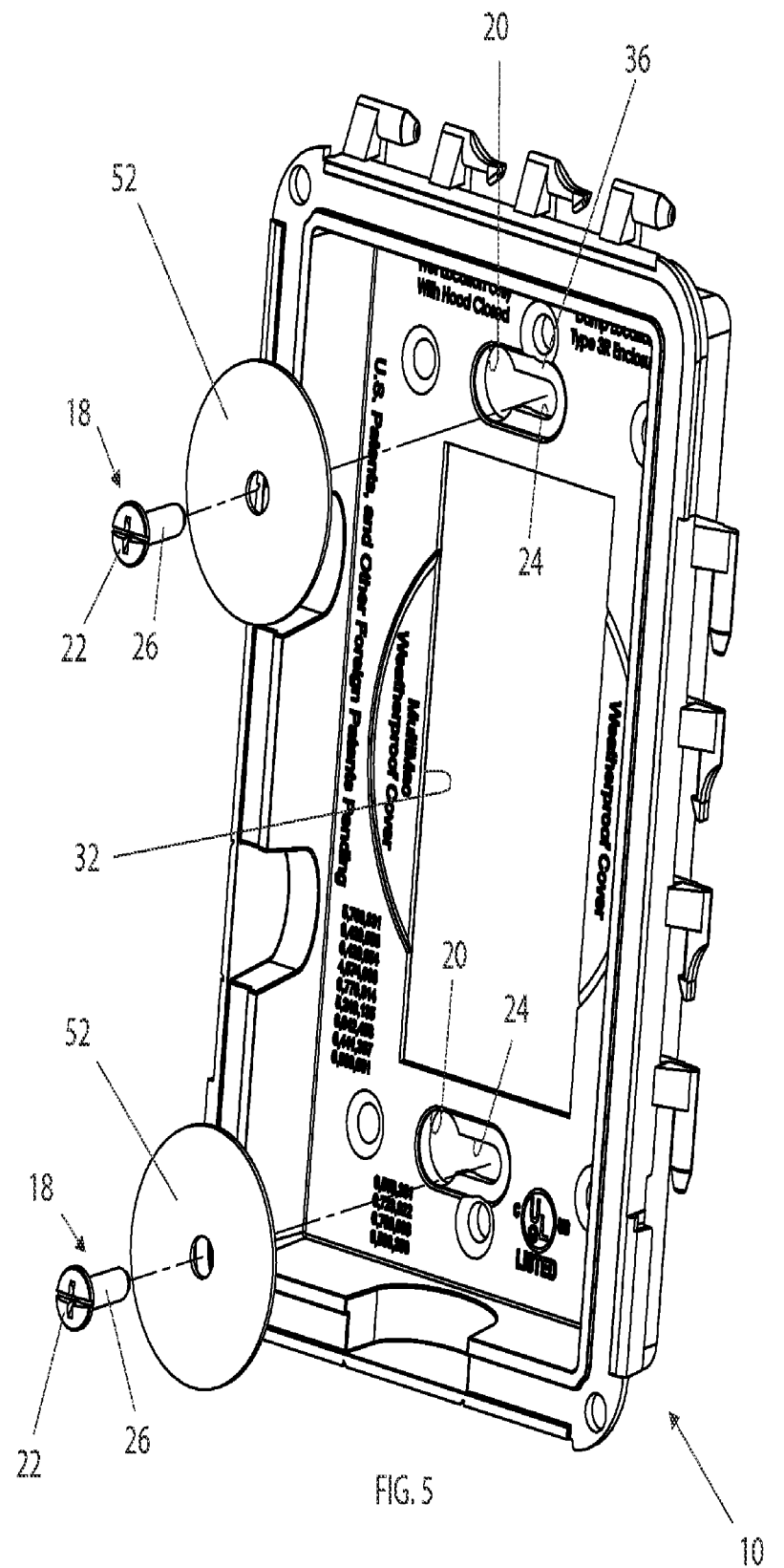
FIG. 5 is an exploded perspective view of an electrical device cover with an enlarged washer.
Figure 6:
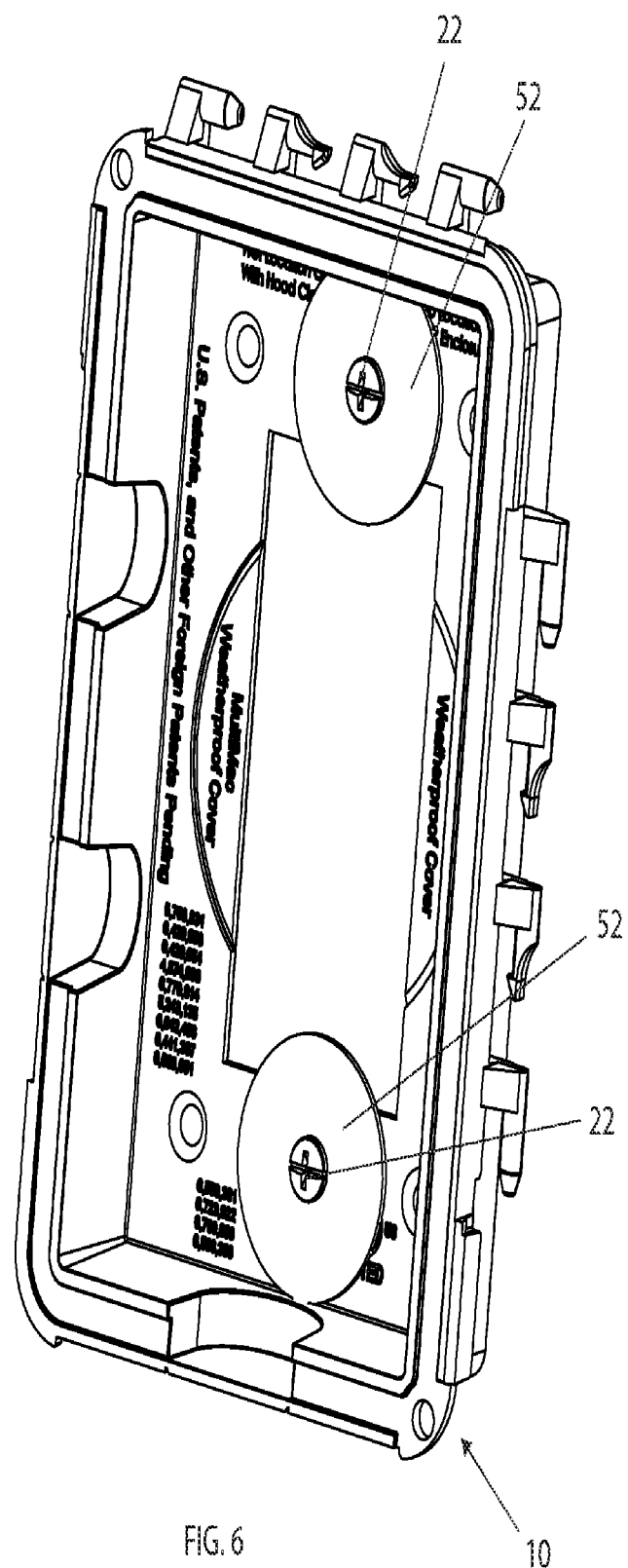
FIG. 6 is a perspective view of an electrical device cover with an enlarged washer installed.
Figure 7:
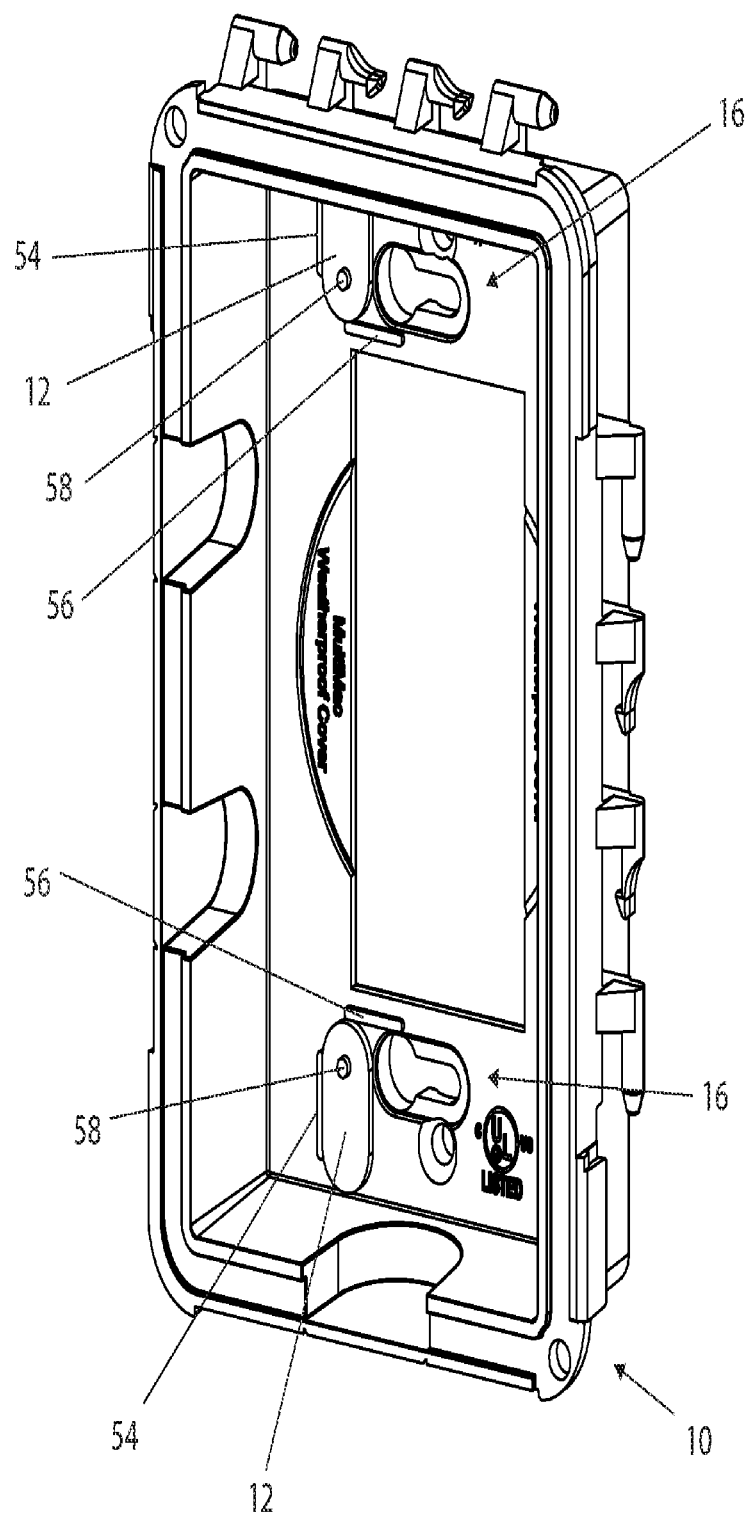
FIG. 7 is a perspective view of an electrical device cover with a keyhole guard in the open position.
Figure 8:
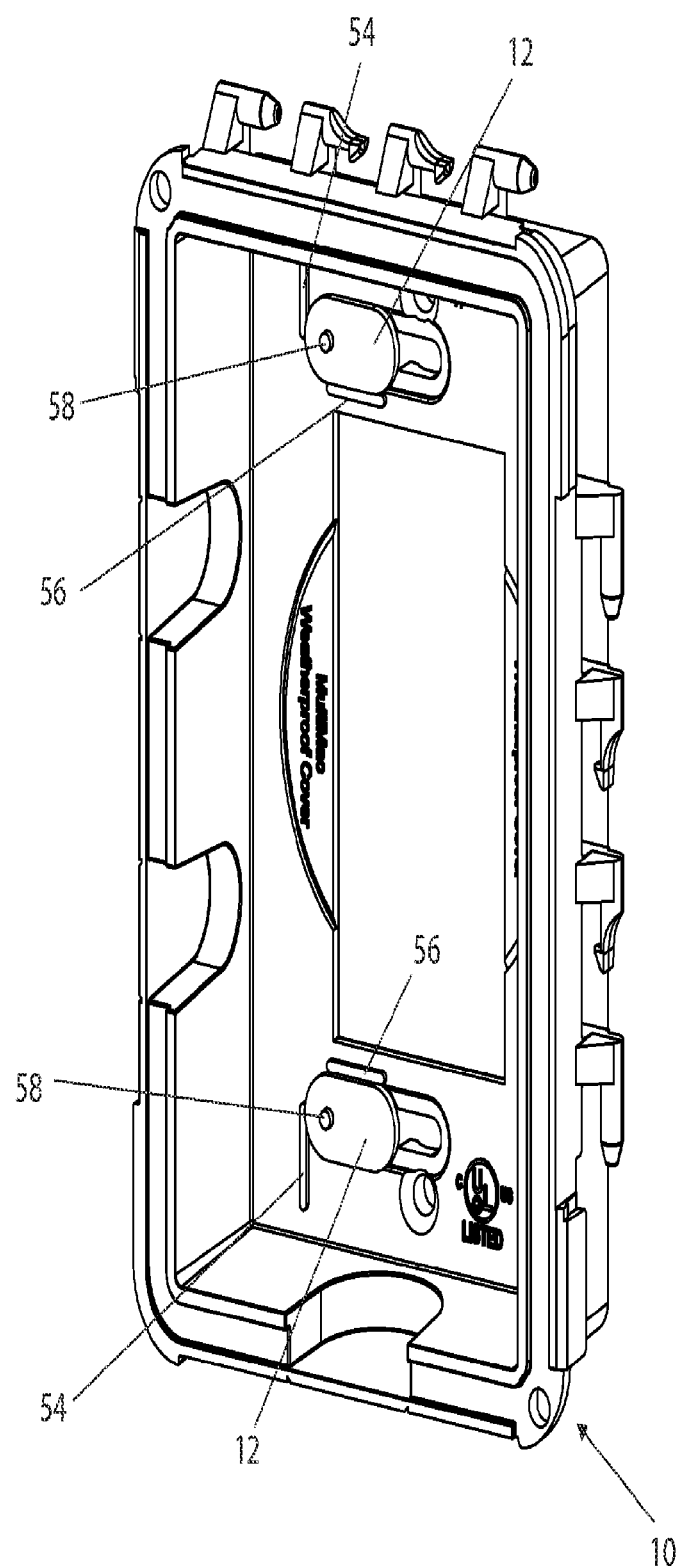
FIG. 8 is a perspective view of an electrical device cover with a keyhole guard in the closed position.
Figure 10:
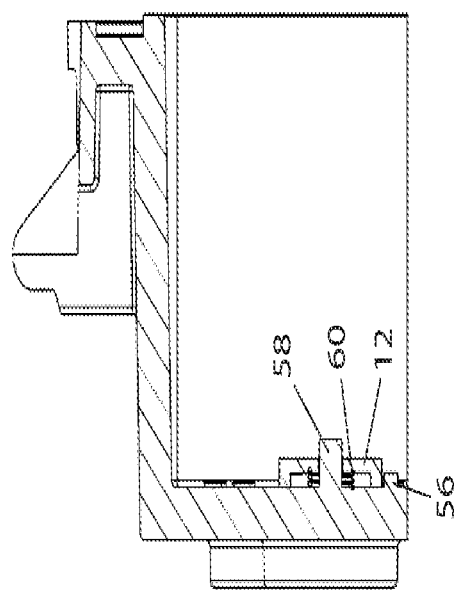
FIG. 10 is a sectional view taken generally about line 10-10 in FIG. 9.
Figure 9:
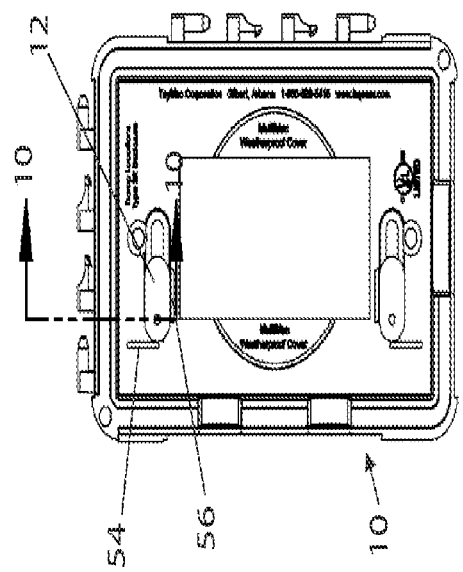
FIG. 9 is a front elevation view of an electrical device cover with a keyhole guard in the closed position.

FIGS. 5 and 6 illustrate a third aspect having mounting screws 18 with enlarged washers 52. Enlarged washers 52 are mounted on mounting screws 18 after base 10 has been located on the electrical box. The mounting screws are inserted though the first opening and partially threaded in place. The user then slides the base into position so that mounting screws 18 are within the second portion of the keyhole. The large size of the enlarged washer is capable of covering the entire keyhole 16 after installation.

FIGS. 7 through 10 illustrate two aspects of a keyhole cover. Base 10 may include an open stop 54 and a closing stop 56 both extending from front surface 28. Still further, a pivot rod 58 extends from the front surface and permits a keyhole cover 12 to rotate between the area enclosed by open stop 54 and closing stop 56. In another implementation, a torsion spring 60 may be located behind keyhole cover 12 and may bias the keyhole cover in either the open or closed position.

During installation in the non-spring biased aspect, the installer rotates the keyhole cover 12 to the open position in contact with open stop 54 and the installation procedure is identical to the above, with the additional step or rotating the keyhole cover to the closed position after the mounting screw is tightened. During installation of the spring biased aspect, the installer pivots the keyhole cover to the open position and must continue to hold the keyhole cover in the open position during installation. Once the screw has been tightened, the keyhole cover can be released and will spring back into position over the first portion and cover any remaining gap in the keyhole.

Figure 11:
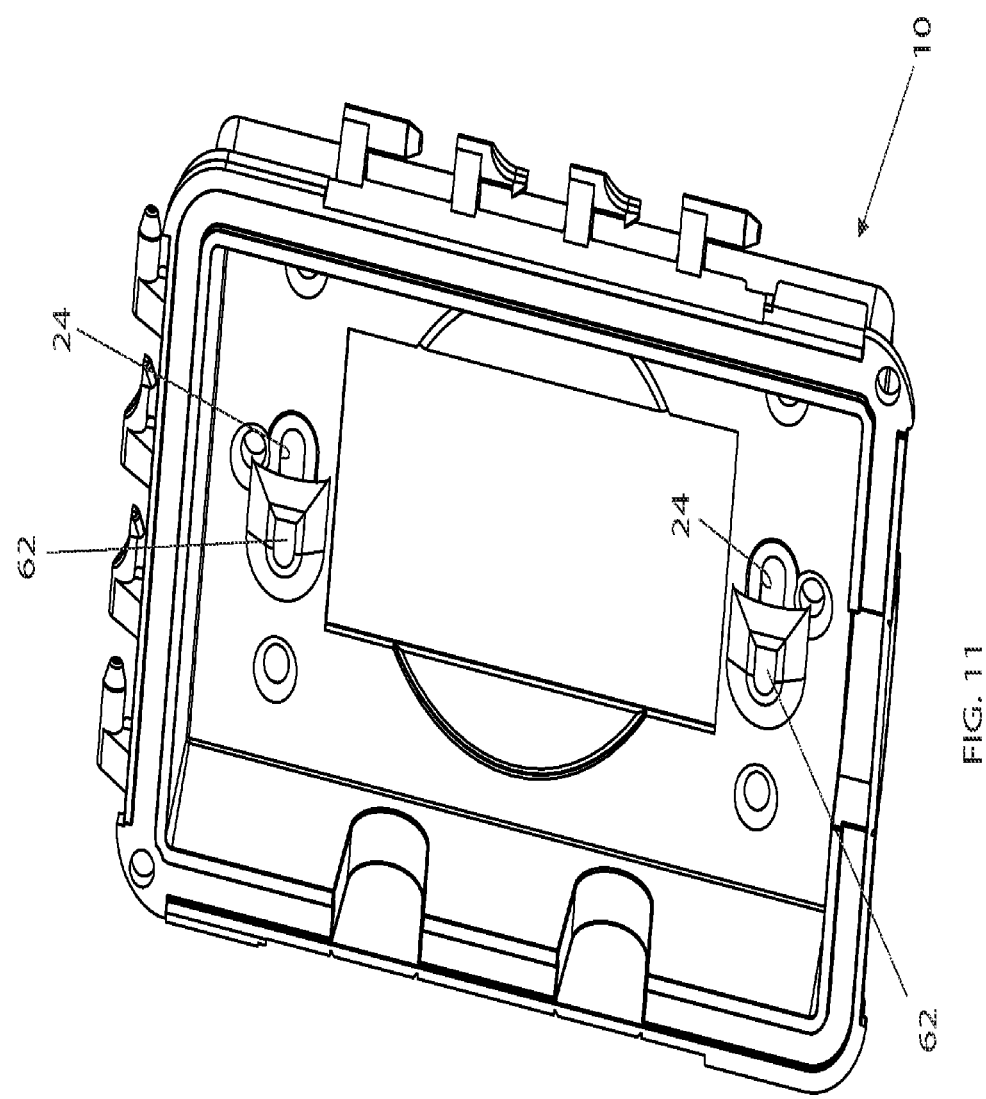
FIG. 11 is a perspective view of an electrical device cover with a keyhole cover installed.
Figure 12:
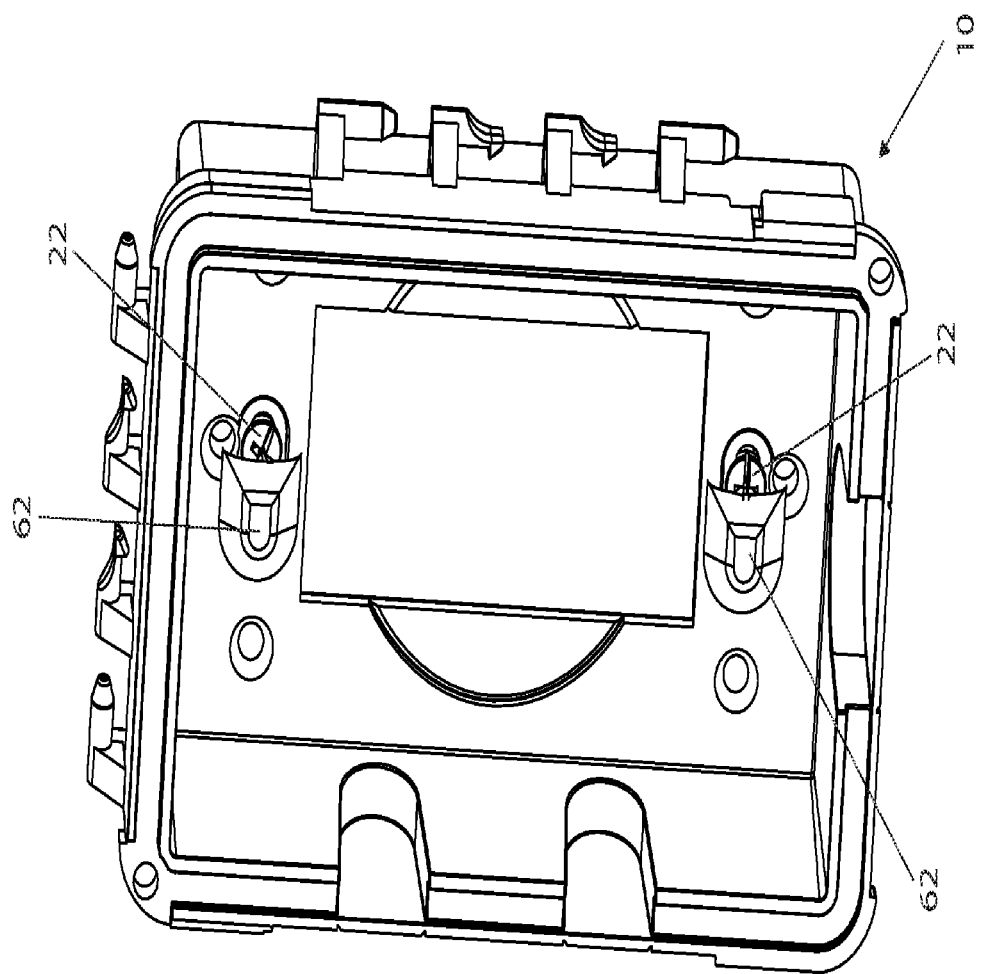
FIG. 12 is a perspective view of an electrical device cover with a keyhole cover installed and a mounting screw therein.

FIGS. 11 and 12 illustrate an additional aspect base with a keyhole cover 62 permanently mounted to the base over the first portion. In this arrangement, the installation procedure is the same as in previous embodiments. However, the mounting screw head is not accessible from within the first portion and the installer must once again slide the base so that the mounting screw protrudes through the second portion. Advantageously, the mounting screw head blocks the second portion, while the first portion is covered by keyhole cover 62.

Figure 13:
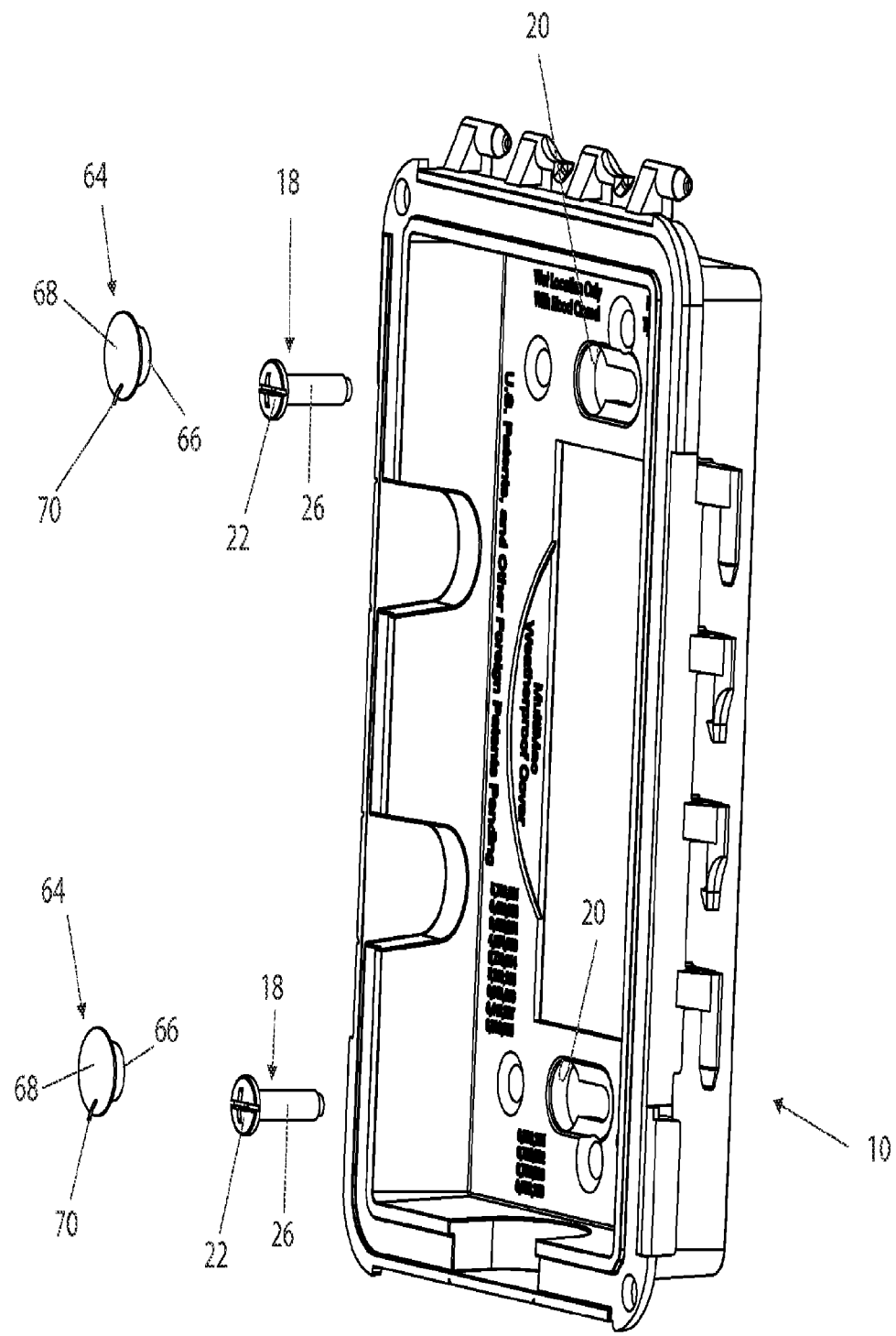
FIG. 13 is an exploded perspective view of an electrical device cover with a keyhole cover.
Figure 14:
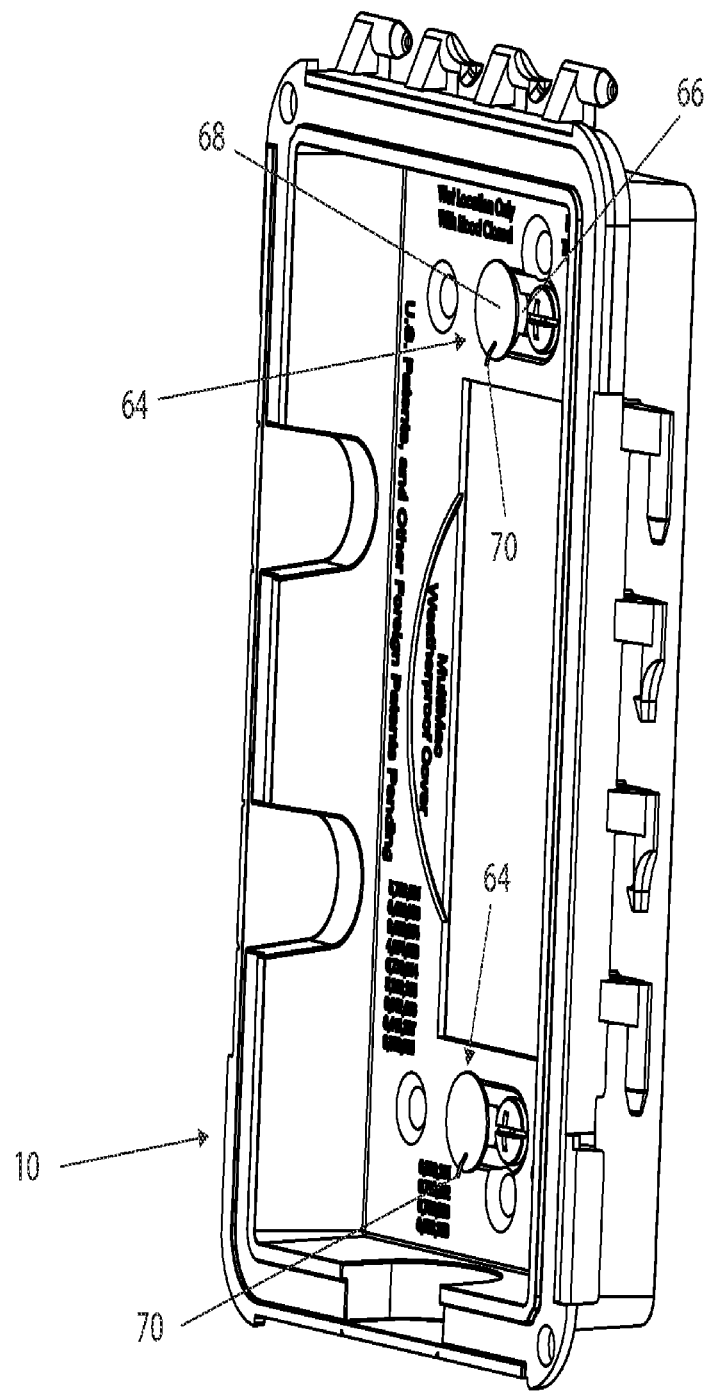
FIG. 14 is a perspective view of an electrical device cover with a keyhole cover installed.

FIGS. 13 and 14 illustrate another aspect base. In this aspect, base 10 includes removable keyhole covers 64 which are sized and shaped to tightly fit within first portion 20 after mounting screws 18 have been installed within second portion 24. Specifically, keyhole covers 64 include a smaller perimeter 66 which extends further into first portion 20 than a larger perimeter 68. Once the keyhole cover is installed, it can be removed by pulling on a tab 70 extending from a top surface of large perimeter 68. Advantageously, keyhole covers 64 may be composed of a flexible material and can conform to abut mounting screw 18 and screw head 22 in addition to first portion 20. Still further, keyhole cover 64 may also be a rigid plastic which snap fits into place within the first portion and abuts mounting screw 18. Thus, to remove the mounting screw, the user must first withdraw the keyhole cover 64 by pulling on tab 70.

Figure 15:
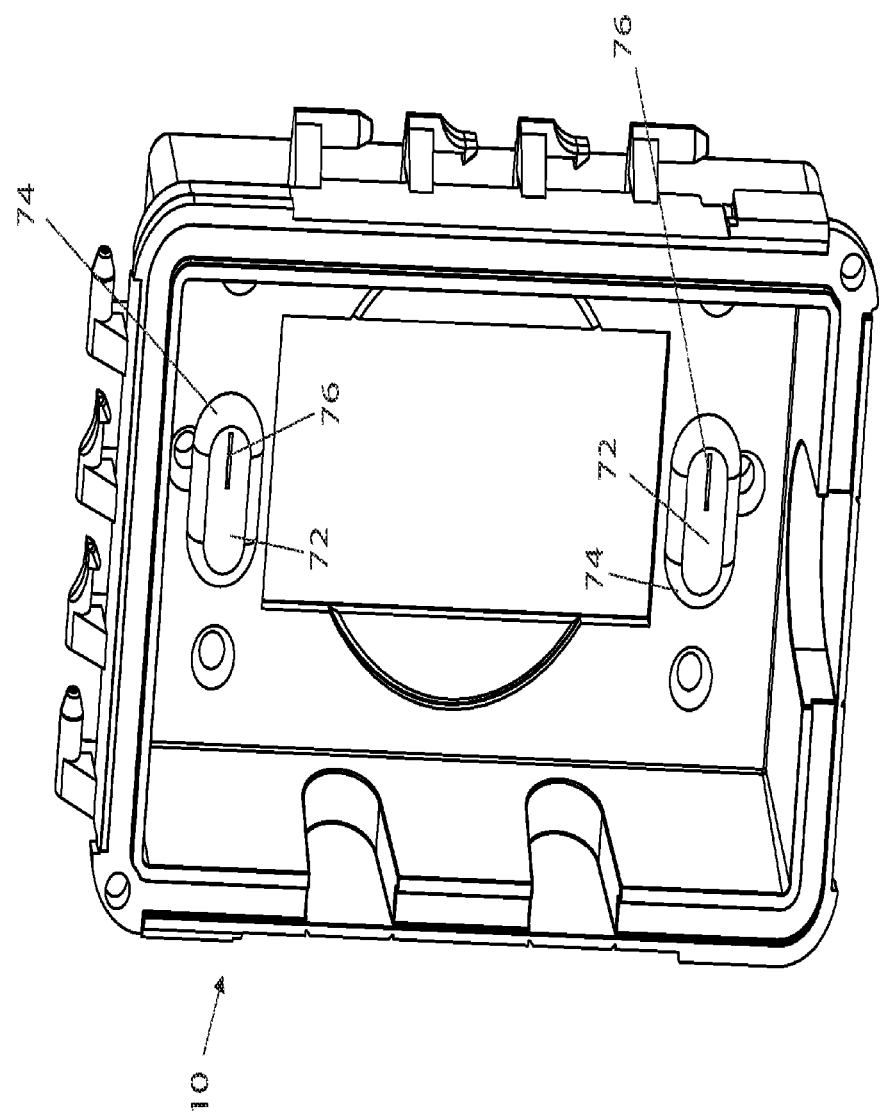
FIG. 15 is a perspective view of an electrical device cover with a keyhole cover having a slit installed.
Figure 16:
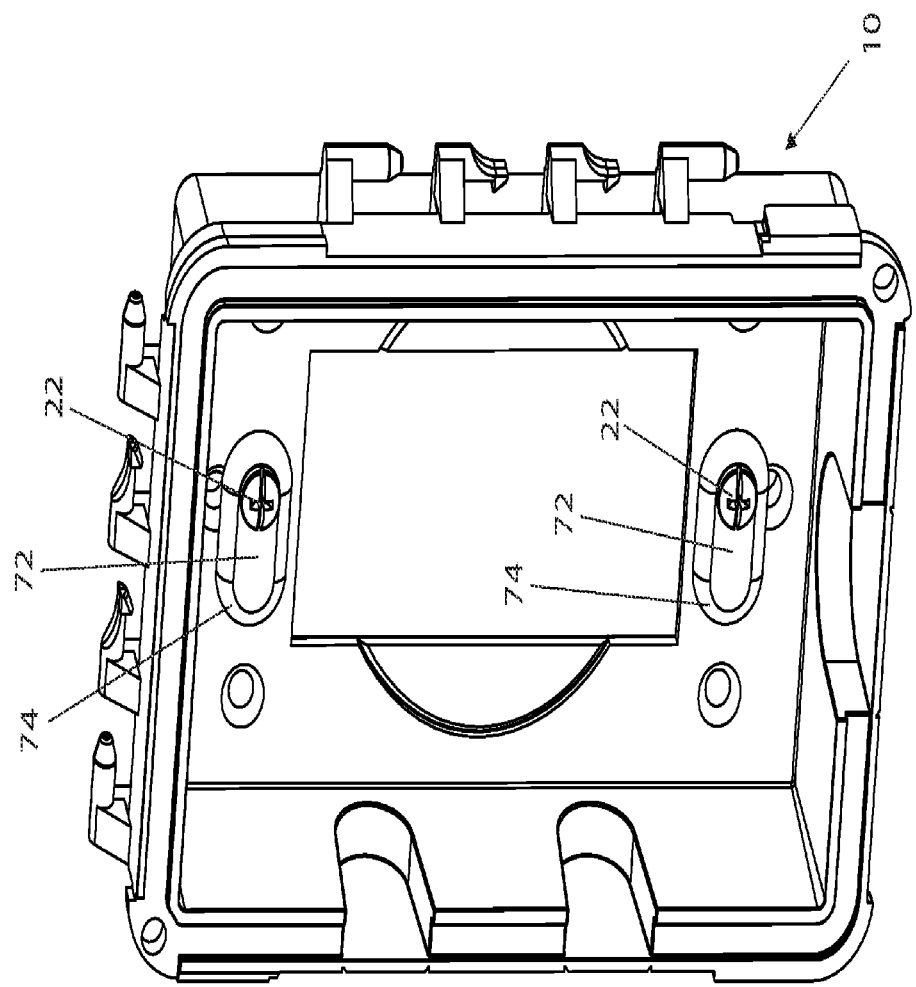
FIG. 16 is a perspective view of an electrical device cover with a keyhole cover having a slit installed and a mounting screw therein.

FIGS. 15 and 16 illustrate yet another aspect base 10 having a keyhole cover 72 with an angled mounting surface 74 extending rearward to contact front surface 28 of base 10 and provide a weather tight seal. Further, keyhole cover 72 may also include a slit 76 of sufficient size to receive head 22 of mounting screw 18 there through. Slit 76 is positioned directly over second portion 24 so that the installation procedure remains the same, except that keyhole cover 72 remains in place throughout installation and once the base is slide sideways to position the mounting screw within the second portion, head 22 extends through slit 76 to permit tightening and loosening of the mounting screw.

Figure 17:
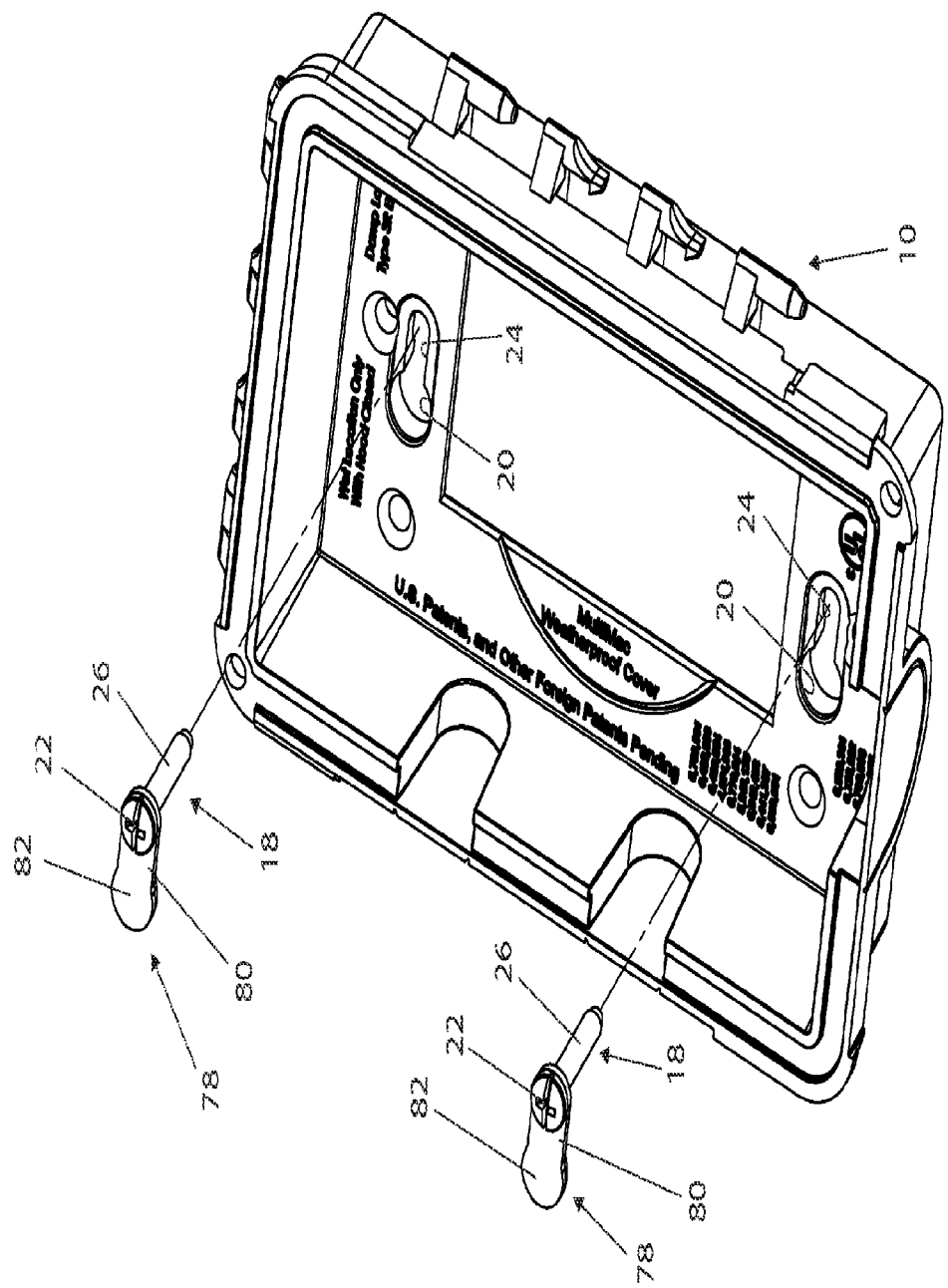
FIG. 17 is an exploded perspective view of an electrical device cover with a keyhole cover mounted on a mounting screw.
Figure 18:
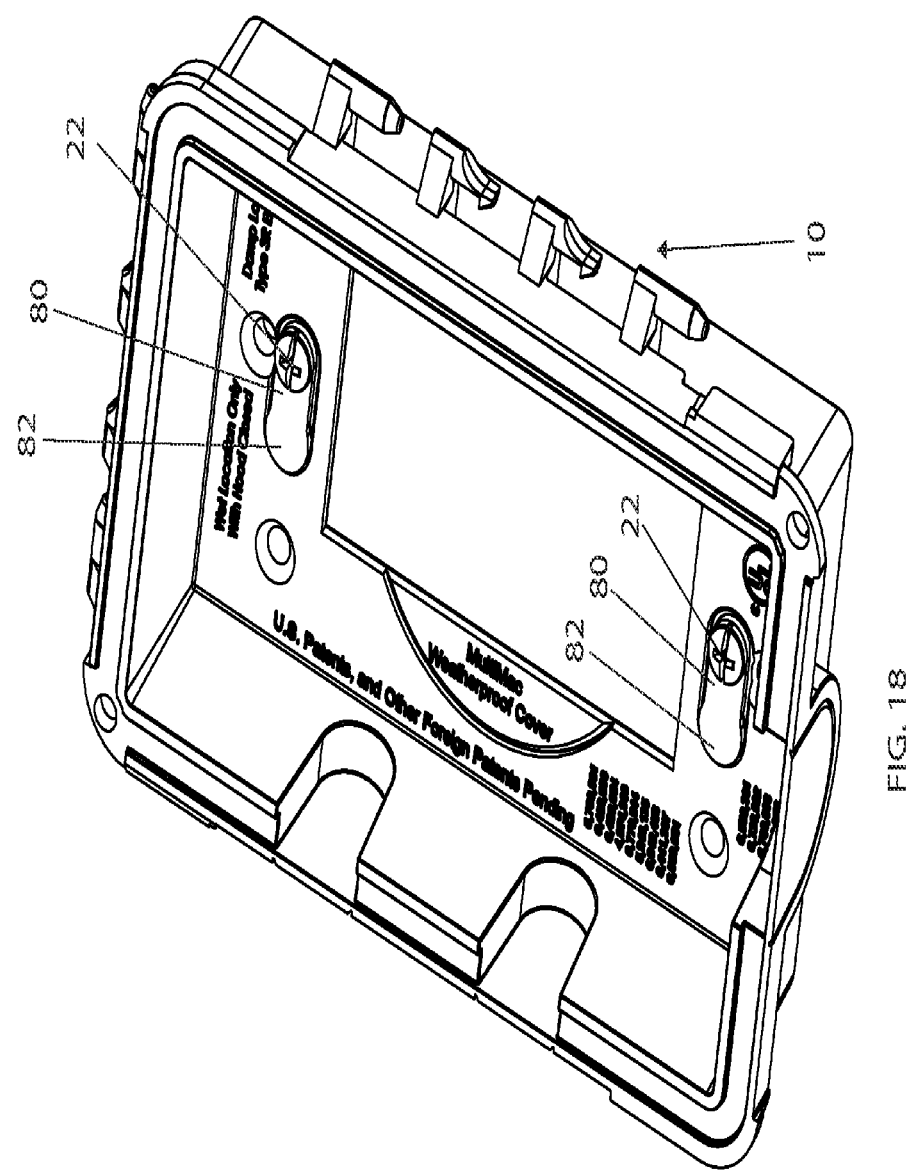
FIG. 18 is a perspective view of an electrical device cover with a keyhole cover mounted and a mounting screw installed into position.
Figure 19:
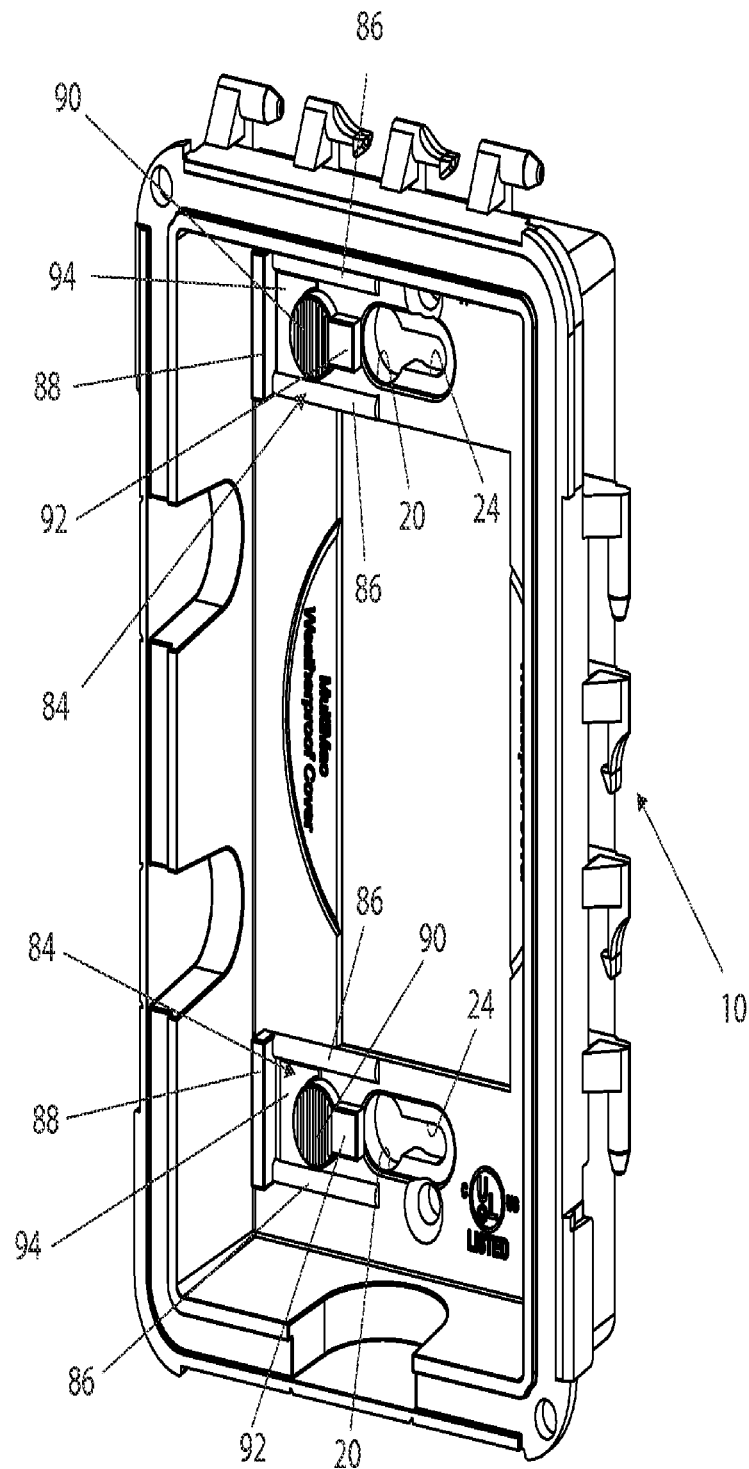
FIG. 19 is a perspective view of an electrical device cover with a keyhole cover in the open position.
Figure 20:
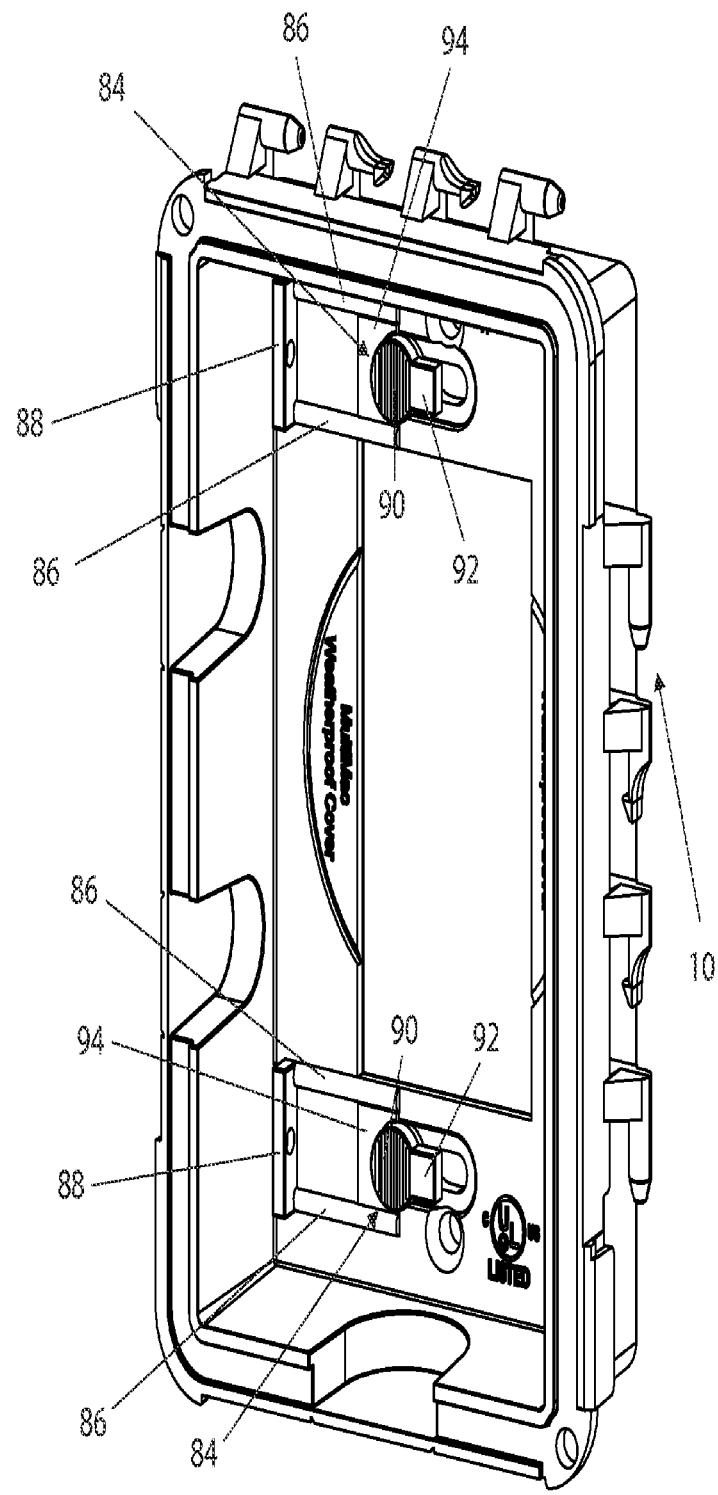
FIG. 20 is a perspective view of an electrical device cover with a keyhole cover in the closed position.
Figure 21:
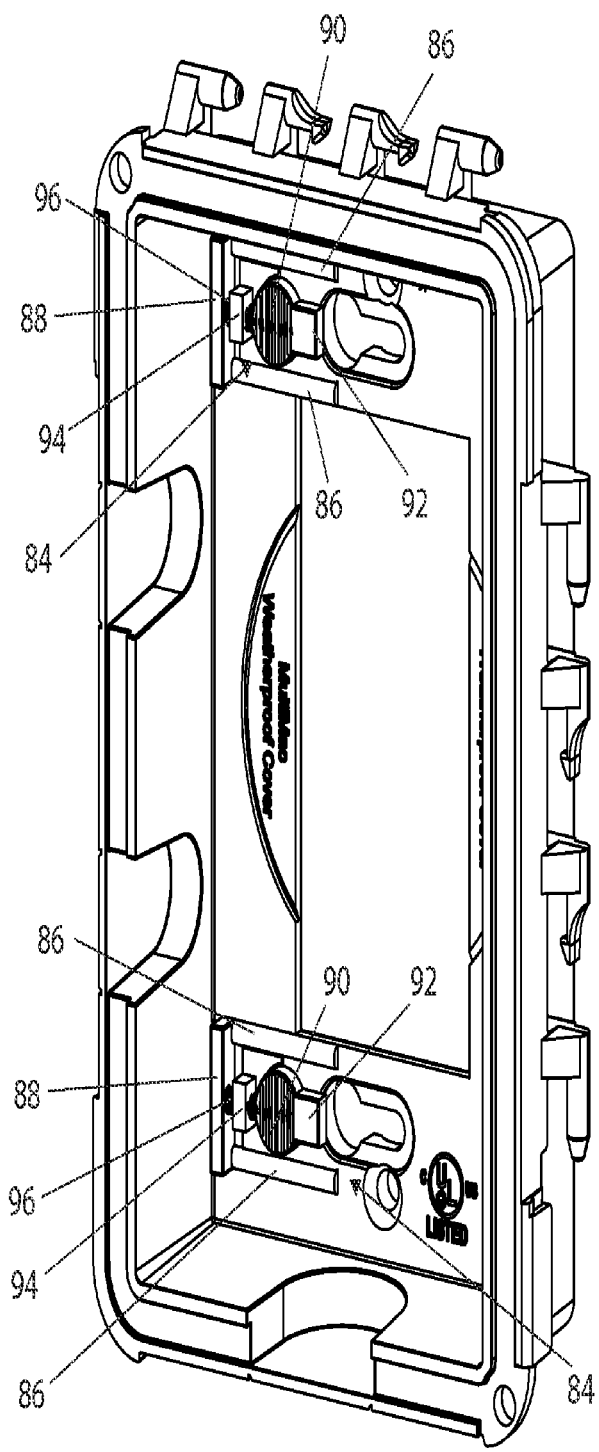
FIG. 21 is a perspective view of an electrical device cover with a keyhole cover in the open position.
Figure 22:
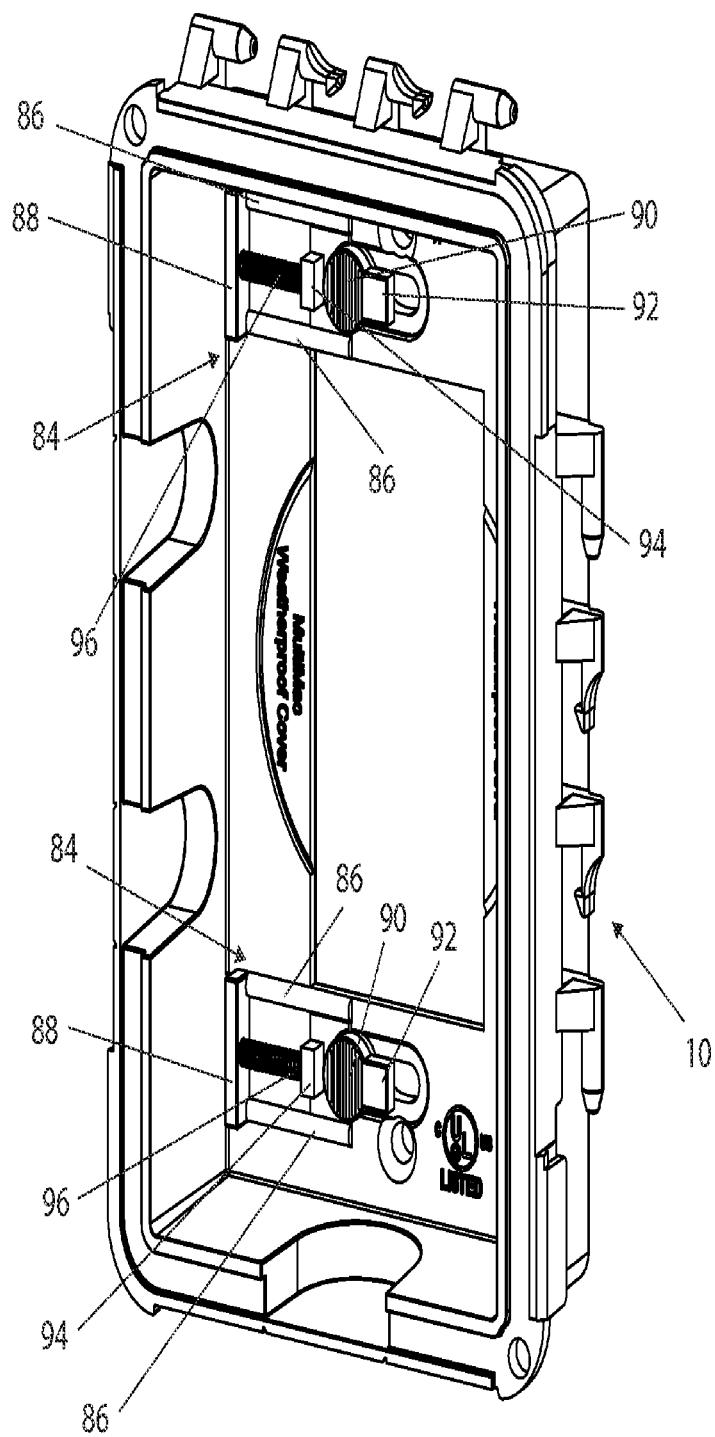
FIG. 22 is a perspective view of an electrical device cover with a keyhole in the closed position.
Figure 23:
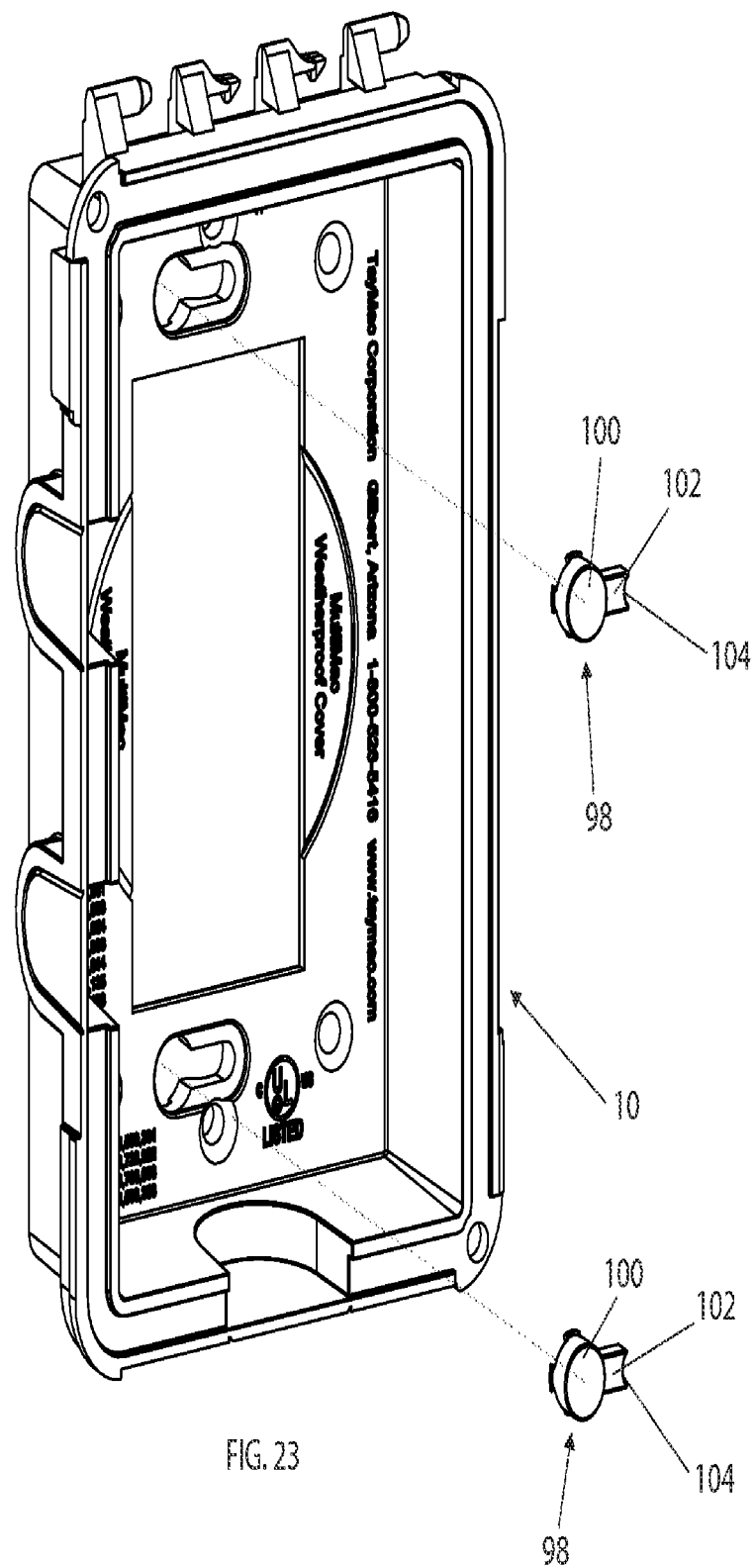
FIG. 23 is an exploded perspective view of an electrical device cover with a keyhole cover.
Figure 24:
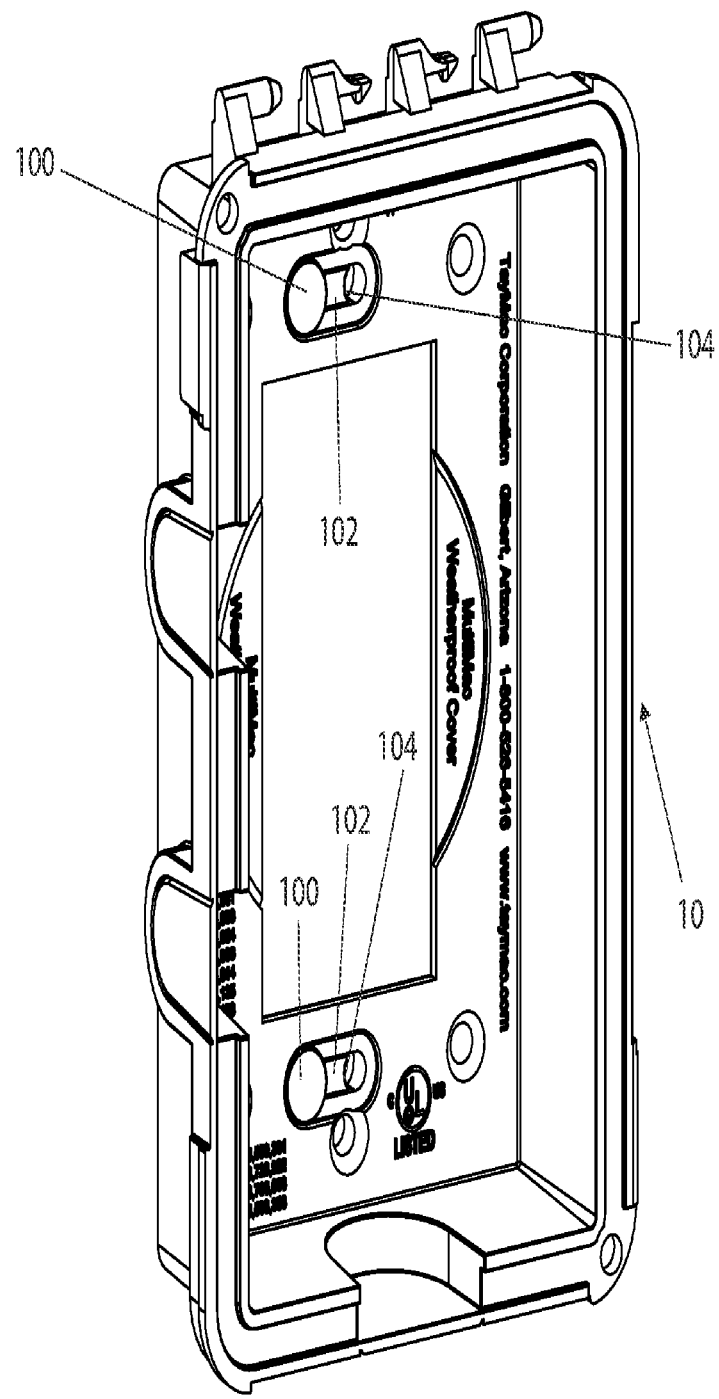
FIG. 24 is a perspective view of an electrical device cover with a keyhole cover in position.

FIGS. 17 and 18 illustrate an aspect where mounting screws 18 include washers 78 having a second portion cover 80 and a first portion cover 82 extending from second portion cover 80. Further, washer 78 includes an opening therein to receive mounting screw shaft 26. Thus, operation remains the same, where the mounting screw is partially installed and then base 10 is mounted thereon through keyholes 16. However, once the base is positioned in its final position, washer 78 is aligned with the first portion cover 82 above first portion 20 to prevent moisture and debris from entering the keyhole.

FIGS. 19 through 22 illustrate two similar aspects of a keyhole cover 84. Keyhole cover 84 is a sliding system with a track 86 and a stop 88 permitting sliding movement therein of the keyhole cover. The keyhole cover includes a first portion cover 90 and a second portion cover 92 with a backer 94, all of which slide together as a single unit to cover any exposed portions of keyhole 16 after the mounting screw has been installed and tightened. As particularly shown in FIGS. 21 and 22, a spring 96 is included and connected between keyhole cover 84 and stop 88 to bias the keyhole cover over the first and second portions automatically. In either the spring-biased or non-spring-biased versions, the user must position keyhole cover 84 out of the first portion and installation remains the same. Then, once the mounting screw is tightened, the installer will position the keyhole cover over the first portion (or permit the spring to push the keyhole cover over the first portion) to prevent moisture or debris from entering the keyhole.

FIGS. 23 through 26 illustrate another aspect of a keyhole cover 98. Keyhole cover 98 includes a first portion cover 100 connected to a second portion cover 102, which each protect the respective keyhole portions therein. Further, second portion cover 102 includes an angled portion 104 which is preferably semi-circular in shape and is adjacent or abuts the mounting screw when the base is mounted in place. A plurality of teeth 106 extend from a back side of front portion cover 102 in one aspect and are shaped, sized, and positioned to engage first portion 20 after installation. The installation process is similar to previous embodiments, where the mounting screw is installed in the same manner. However, keyhole cover 98 is then installed next. Keyhole cover 98 is inserted within the keyhole adjacent the installed mounting screw until teeth 106 engage base 10 and the keyhole cover is secured in position. To remove the keyhole cover, the mounting screw must be completely removed before the keyhole cover can be pried out of place. This is due to the tight tolerances of the keyhole cover and the teeth engaging the rear surface of base 10, which is inaccessible after installation.

In these and in any other aspects, the electrical device cover may be made of any materials and fabricated and/or assembled in any manner. For instance the electrical device cover may be manufactured from various different pieces and then screwed or glued together. The various elements, such as portions of the electrical device cover may be manufactured as one piece or may be manufactured as separate pieces to be joined together.

It will be understood that implementations are not limited to the specific components disclosed herein, as virtually any components consistent with the intended operation of a method and/or system implementation for an electrical device cover may be utilized. Accordingly, for example, although particular bodies, arms, springs, and other components are disclosed, such components may comprise any shape, size, style, type, model, version, class, grade, measurement, concentration, material, weight, quantity, and/or the like consistent with the intended operation of a method and/or system implementation for an electrical device cover.

Implementations are not limited to uses of any specific components, provided that the components selected are consistent with the intended operation of a method and/or system implementation for electrical device cover.

Accordingly, the components defining any electrical device cover may be formed of any of many different types of materials or combinations thereof that can readily be formed into shaped objects provided that the components selected are consistent with the intended operation of an electrical device cover implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any electrical device cover implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The implementations listed here, and many others, will become readily apparent from this disclosure. From this, those of ordinary skill in the art will readily understand the versatility with which this disclosure may be applied.

The invention claimed is:

1. An electrical outlet cover comprising:
   a base;
   a mounting screw aperture extending through the base, the mounting screw aperture having a first portion sized large enough to receive a head of a mounting screw, and a second portion extending to the first portion and through the base, the second portion sized large enough to allow a shaft of the mounting screw to extend through the base but small enough to disallow the head of the mounting screw from passing through the base; and
   a keyhole cover pivotally connected to the base and positioned to at least partially cover the first portion of the mounting screw aperture; and
   wherein the second portion of the mounting screw aperture is accessible after the base is installed on an electrical outlet for selective tightening, loosening, and adjustment of the base.

2. The electrical outlet cover of claim 1, wherein the base includes a first side wall and a first hinge member extending from the first side wall.

3. The electrical outlet cover of claim 2, wherein the base includes a second side wall oriented at approximately 90 degrees to the first side wall and a second hinge member extending from the second side wall.

4. The electrical outlet cover of claim 1, further comprising an opening extending through the base sized to receive a two-gang outlet.

5. The electrical outlet cover of claim 1, wherein the keyhole cover pivots from a first position covering the first portion to a second position exposing the first portion.

6. The electrical outlet cover of claim 1, further comprising a first stop extending from the base and a second stop extending from the base, wherein the first stop and the second stop limit rotation of the keyhole cover.

7. The electrical outlet cover of claim 1, wherein the keyhole cover is pivotally connected to the base by a pivot rod.

8. The electrical outlet cover of claim 5, wherein a biasing member biases the keyhole cover to the first position.

9. The electrical outlet cover of claim 8, wherein the biasing member is a torsion spring.

10. The electrical outlet of claim 8, wherein the biasing member is positioned on an opposite side of the base from the keyhole cover.

11. The electrical outlet of claim 5, wherein the second portion is exposed when the keyhole cover is in the first position.

12. An electrical outlet cover comprising:
    a base;
    a mounting screw aperture extending through the base, the mounting screw aperture having a first portion sized large enough to receive a head of a mounting screw, and a second portion extending to the first portion and through the base, the second portion sized large enough to allow a shaft of the mounting screw to extend through the base but small enough to disallow the head of the mounting screw from passing through the base; and
    a keyhole cover slidably connected to the base and positioned to at least partially cover the first portion of the mounting screw aperture; and
    wherein the second portion of the mounting screw aperture is accessible after the base is installed on an electrical outlet for selective tightening, loosening, and adjustment of the base.

13. The electrical outlet cover of claim 12, wherein the base includes a first side wall and a first hinge member extending from the first side wall and a second side wall oriented at approximately 90 degrees to the first side wall and a second hinge member extending from the second side wall.

14. The electrical outlet cover of claim 12, further comprising an opening extending through the base sized to receive a two-gang outlet.

15. The electrical outlet cover of claim 12, wherein the keyhole cover slides from a first position covering the first portion to a second position exposing the first portion.

16. The electrical outlet cover of claim 12, further comprising an upper track and a lower extending from the base and slidably engaging the keyhole cover.

17. The electrical outlet cover of claim 12, wherein the keyhole cover includes a first portion cover and a second portion cover.

18. The electrical outlet cover of claim 15, wherein a biasing member biases the keyhole cover to the first position.

19. The electrical outlet cover of claim 18, wherein the biasing member is positioned on the same side of the base as the keyhole cover.

20. The electrical outlet of claim 18, wherein the biasing member engages a stop extending from the base.

\* \* \* \* \*